Dec. 27, 1938.    H. ERNST ET AL    2,142,021
AUTOMATIC DYNAMIC BALANCER FOR MACHINE TOOLS
Filed Sept. 3, 1937    3 Sheets-Sheet 2
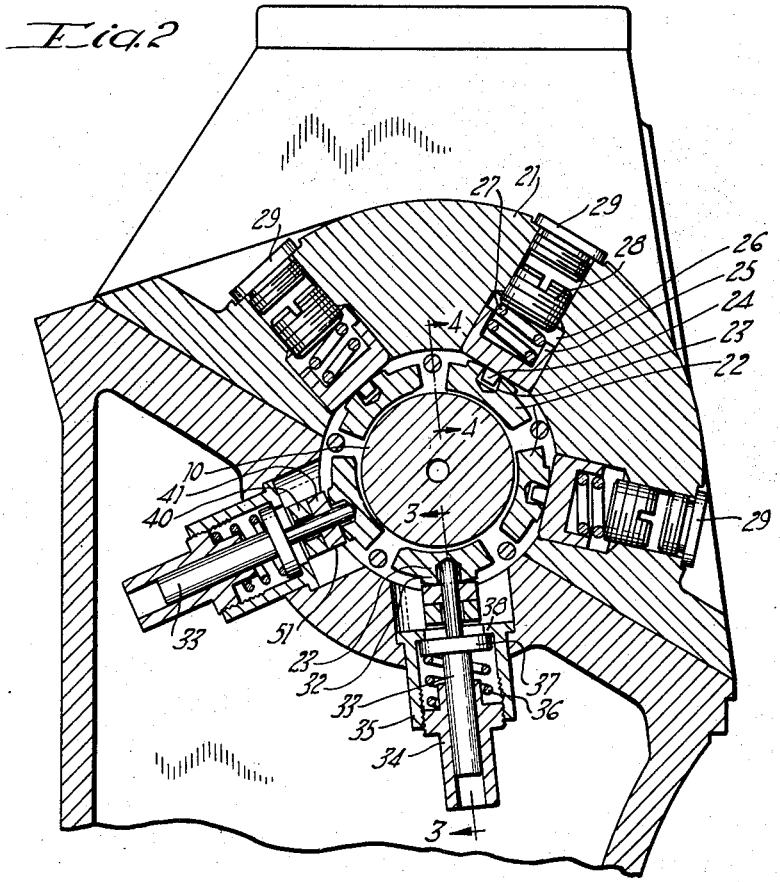
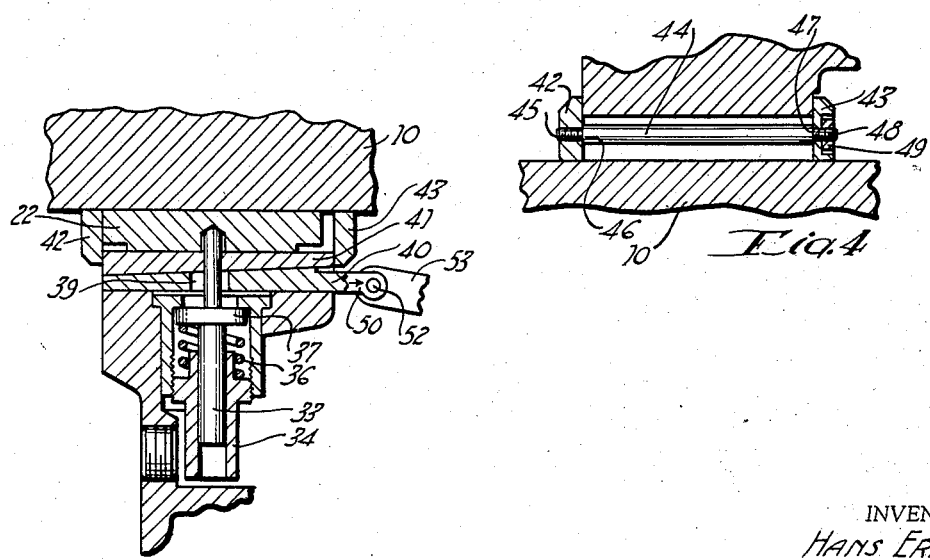
INVENTOR.
HANS ERNST
ALBERT H. DALL
BY
A. H. Parsons
ATTORNEY.

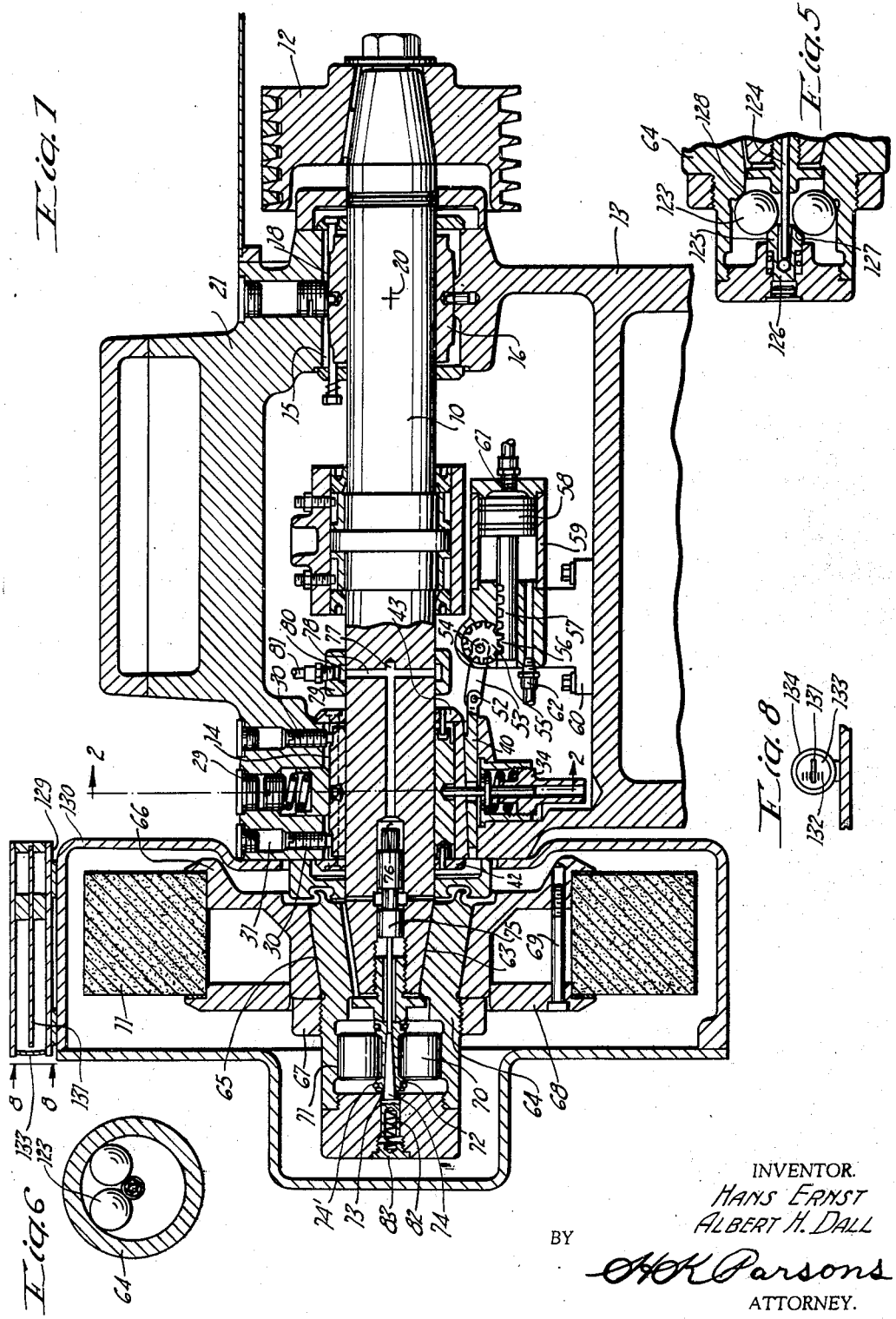

Dec. 27, 1938.  H. ERNST ET AL  2,142,021
AUTOMATIC DYNAMIC BALANCER FOR MACHINE TOOLS
Filed Sept. 3, 1937  3 Sheets-Sheet 3

INVENTOR.
HANS ERNST
ALBERT H. DALL
BY
ATTORNEY.

Patented Dec. 27, 1938

2,142,021

UNITED STATES PATENT OFFICE 2,142,021

AUTOMATIC DYNAMIC BALANCER FOR MACHINE TOOLS

Hans Ernst, Cincinnati, and Albert H. Dall, Silverton, Ohio, assignors to Cincinnati Grinders Incorporated, Cincinnati, Ohio, a corporation of Ohio Application September 3, 1937, Serial No. 162,242

14 Claims. (Cl. 51—169)

This invention relates to machine tools and more particularly to means for dynamically balancing the same.

One of the objects of this invention is to provide improved automatic means for dynamically balancing the spindle assemblies of machine tools.

Another object of this invention is to provide a dynamic balancing mechanism which may be self contained in a machine tool spindle and subject to utilization at any time by the operator of the machine for re-adjusting the dynamic balance of the rotating parts.

A further object of this invention is to provide an improved hydraulic control mechanism for governing the adjustment of a dynamic balancing mechanism.

An additional object of this invention is to simplify the operation of dynamically balancing a machine tool so that such operations may be removed from the category of laboratory work and placed in the hands of the operator of the machine for routine performance.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 1 is a section through a machine tool showing the application of this invention to a rotating spindle assembly thereof.

Figure 2 is a section on the line 2—2 of Figure 1.

Figure 3 is a sectional view on the line 3—3 of Figure 2.

Figure 4 is a detail sectional view on the line 4—4 of Figure 2.

Figure 5 is a detail view showing the use of balls as balancing weights.

Figure 6 is a view showing the weights in a maximum balancing position.

Figure 8 is an end view of the vibration indicator as viewed on the line 8—8 of Figure 1.

Figure 7:
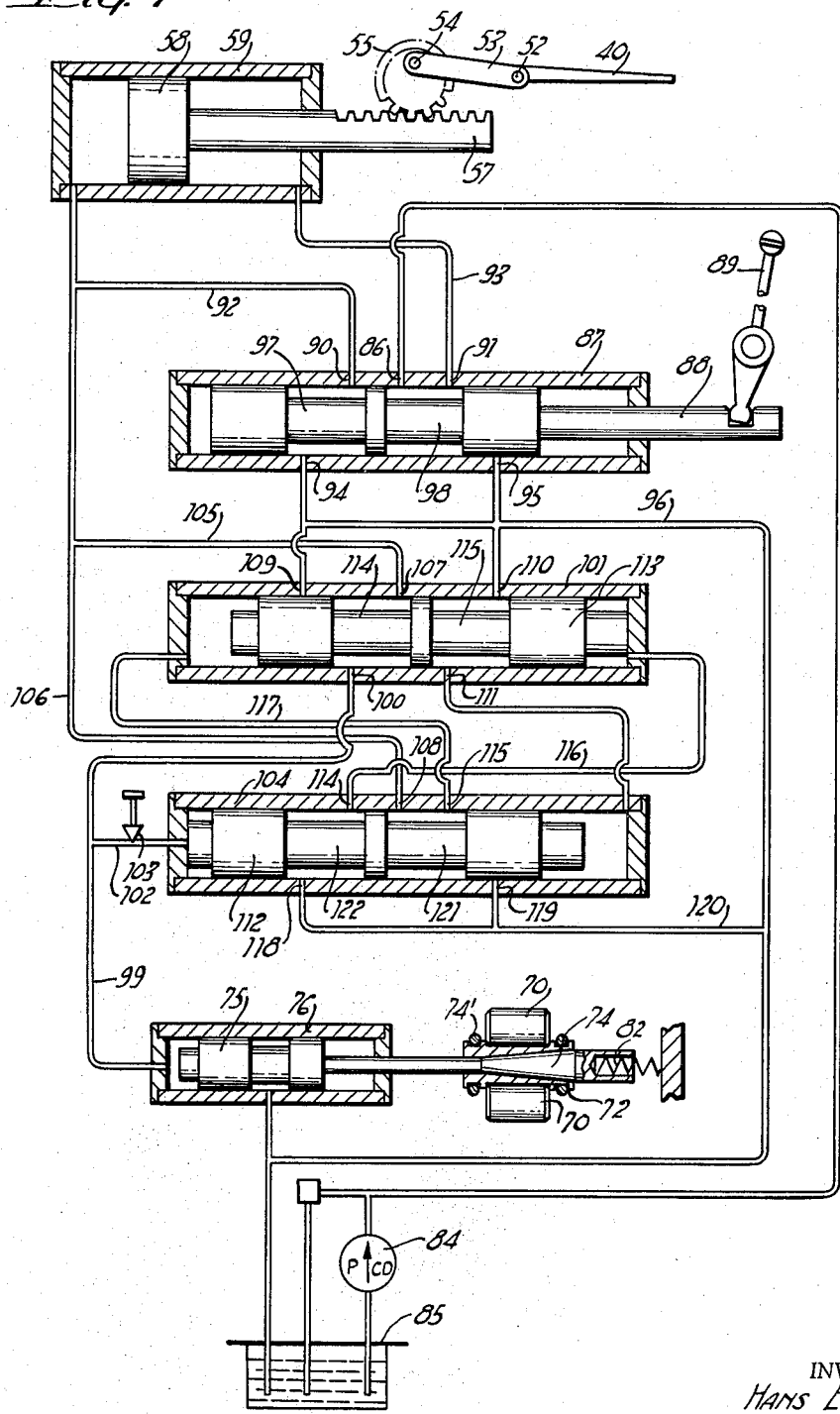
Figure 7 is a diagram of the hydraulic control circuit.

Many machine tools have a main operating spindle which is adapted to interchangeably receive different tools or working elements, with the result that the spindle assembly usually becomes unbalanced whenever a change of tools is made. A grinding machine is a good example of a machine tool having a spindle which is adapted to receive different working elements, for it is well known that grinding wheels wear out and have to be replaced; and also that they are changed from time to time to suit the nature of the work being ground.

A grinding machine is a precision machine, and the work done by it must not only be accurate, but it must produce a smooth round finish on the work. It is well known that vibration of the spindle assembly is detrimental to the attainment of these results.

This chatter or vibration is usually caused by residual unbalance in the spindle assembly, and will occur even although the spindle and the grinding wheel are separately balanced before assembly. By means of this invention the entire assembly may be balanced in situ in the machine at any time that undesirable vibration occurs and by a machine operator who is unfamiliar with the principles of dynamic balancing.

Referring to Figure 1 of the drawings, the reference numeral 10 indicates the spindle of a machine tool, such as a grinding machine, which carries at one end a grinding wheel 11; and at the other end, a driving member 12. The machine frame 13 is provided with a pair of aligned apertures 14 and 15 in which are mounted bearing means for supporting the spindle for rotation.

The bearing means provided in the aperture 15 may consist of a plurality of rocker shoes 16 which have longitudinally straight faces next to the journal portion of the spindle, and have slightly curved backs 18 for rocking engagement with the shoe positioning members. The center of the radius of these curved surfaces is the center of the shaft as indicated by the reference numeral 20. By means of this arrangement, the grinding wheel end of the spindle may move laterally a prescribed amount without causing any binding between the shoes 16 and the spindle. This provision is made so that the bearing members in the aperture 14 may be released to permit the spindle assembly to have freedom of movement to run out if in an unbalanced condition. In practice the normal bearing clearance may be sufficient to permit the desired freedom of movement without this special provision.

The construction of the bearing assembly in aperture 14 whereby the same may be released is more particularly shown in Figure 2 to which reference may now be had. The aperture 14 is formed partially in the frame 13 and partially in the cap member 21. The spindle 10 is supported in this aperture by a plurality of equally spaced rocker shoe bearing members 22. Five such shoes have been found to be a convenient number and are so illustrated in the drawings. It will be noted that three of these shoes are carried by the cap member, and the remaining two shoes by the frame 13.

The rocker shoes bearing members 22 are the same as those shown in U. S. Patent No. 2,072,814 issued March 2, 1937, and further description thereof is not believed to be necessary. The three upper shoes have a small socket 23 formed in the back thereof for receiving a pin 24 projecting from the end of a slidable plunger 25. These plungers are reciprocably mounted in radial bores 26 and are urged radially inward by springs 27 which are interposed between the ends of the respective plungers and adjustable set screws 28 threaded in a reduced part of the bores 26. To prevent foreign material from entering these bores, cap screws 29 are threaded into the outer end thereof. It will now be evident that by removing a cap screw, access may be had to the adjustable set screw for varying the pressure of the spring 27 on the rocker shoe. These springs serve to move the end of the spindle eccentric to its normal axis of rotation when the lower bearing shoes are released.

Means are provided for positively determining the axis of rotation of the spindle, or in other words, for rigidly holding the spindle against lateral movement during grinding. To this end, a pair of adjustable set screws 30 are threaded in bores 31 located on opposite sides of each of the plungers 25 and so positioned that they will hold the rocker shoe against outward radial movement as well as maintain the same in parallel alignment with the spindle when the bearing structure is locked.

The two lower rocker shoes, which are releasable for purposes of balancing, also have a recess 23 formed in the back thereof for receiving the conical end 32 of a plunger 33 which is slidably mounted in a bore formed in a plug 34 threaded into the end of a sleeve 35 fixed with the frame 13. A spring 36 is interposed between the plug and a flange 37 formed integral with the plunger 33. The flange is held against an annular shoulder 38 formed on the end of the sleeve. By rotatably adjusting the plug 34, the tension of the spring 36 may be varied. The plunger 33 passes through an elongated hole 39 formed in a tapered wedge 40 as shown in Figure 3. A second wedge 41 having a taper which is complementary to the taper of the wedge 40 is interposed between the wedge 40 and the rocker shoe 22. The wedge 41 is held in a fixed axial position by a pair of annular rings 42 and 43 which surround the spindle.

These rings are of sufficient width to overlap on the frame 13 and cap 21. They do not tightly grip, however, the ends of the wedge member 41 nor the sides of the frame 13 or the cap member 21, but are independently held a fixed distance apart by a plurality of bolts 44 as more particularly shown in Figure 4. These bolts have a reduced threaded portion 45 on one end which forms a shoulder 46 whereby the bolt is threaded into the member 42 a sufficient distance to bring the shoulder into tight contact with the ring. A second shoulder 47 is formed on the other end of the member 44 a precisionly measured distance from the shoulder 46 so as to maintain a close fit without binding. The reduced end 48 of the bolt is passed through the ring 43 and a nut 49 threaded on the end for holding the ring 43 against the shoulder 47.

It should now be evident that if the wedge member 40, as viewed in Figure 3, is pulled in the direction of the arrow 50 that the wedge member 41 is free to move away from the spindle, although constrained against endwise movement by the rings 42 and 43. The pairs of complementary wedge members 40 and 41 are slidably mounted in rectangular grooves 51 formed in the frame 13 which thereby serve as guiding means for the wedge members 40 and prevent lateral movement of the complementary wedge members 41. Since the springs 27 maintain a continuous radial urge on the three upper rocker shoes in the cap member 21, it will be evident that when the wedge members 40 are withdrawn, that the spindle will be moved downward, or in other words, into eccentric relation to its normal axis of rotation, and this downward movement will compress the springs 36 acting on the lower rocker shoes 22 so that the entire spindle assembly is now supported between the five springs which thereby reduces the restraint on the spindle and lowers the natural frequency of vibration of the entire assembly to a value less than the rotating frequency, for purposes hereinafter to be explained.

The mechanism for shifting the wedge members 40 is more particularly shown in Figure 1 and will now be described. These members have a hole drilled in the end thereof through which passes a connecting pin 52. This pin is connected by a link 53 to an eccentric pin 54 secured to a rotatable pinion 55. The pinion intermeshes with rack teeth 56 formed on a piston rod 57. A piston 58 slidably mounted in a cylinder 59 is secured to the end of the piston rod. The rack and pinion means is supported in a housing 60 which is attached to a fixed part of the frame 13. One end of the cylinder is provided with a port 61 through which pressure is admitted to cause clockwise rotation of the pinion through an angle of approximately 180° to cause withdrawal of the wedges. The other end of the cylinder has a port 62 through which fluid pressure is admitted to cause movement of the piston in the other direction and thereby insertion of the wedges to a locking position. It will thus be apparent that when the piston is moved to the left, as viewed in Figure 1, that the bearing becomes unlocked, and when moved to the right, the bearing is locked.

The tapered end 63 of the spindle has an adapter 64 mounted thereon inside of which is formed a raceway for the balancing weights. The outside periphery of the adapter has a tapered surface 65 for receiving the grinding wheel collet 66. This collet is held in position by a nut 67 threaded on the adapter 64. The grinding wheel 11 is clamped between the collet 66 and a wheel flange 68 by means of a series of clamping bolts 69 which pass through holes in the flange and are threaded in the collet.

The balancing weights consist preferably of a pair of cylindrical rollers 70, because the rolling friction is theoretically less and because the unbalanced correction that can be effected thereby is substantially 50% greater than by the use of balls of the same diameter. These rollers travel on a raceway 71 and are held against axial movement by flanges 72 formed on a centrally located collet 73. This collet is split lengthwise into three or more pieces, and a tapered stud 74 passes through the center for expanding the collet into clamping engagement with the weights regardless of their circumferential position. Springs 74' maintain the collet in contact with the stud 74. The stud is connected to a piston 75 which is reciprocably mounted in a cylinder 76 formed interiorly of the spindle. An axial bore 77 connects the end of this cylinder to a cross bore 78 which terminates in a distributer collar 79 mounted on the spindle and having an internal annular groove 80 which is in constant communication with the ends of the cross bore. The collar is held against rotation by a connecting pipe 81 which leads to an hydraulic control system, more particularly shown in Figure 7.

A spring 82 is interposed between the end of the tapered stud 74 and the end of the plug 83 fitted in the end of the adapter for continuously urging the stud in a clamping direction, whereby the weights are normally held in a clamped position.

In a practical grinding machine, the natural frequency of vibration of the mounting is higher than the rotating frequency, and therefore the rotating member will rotate with its heavy side out. This means that if the balancing weights were free to move they would run to the heavy side of the rotating member, thus further increasing the unbalance. When the spindle assembly is unclamped so as to be supported between the five springs, as hereinbefore described, the natural frequency of vibration of the mounting will be lower than the rotating frequency, and therefore the rotating member will rotate with its light side out, and thus the balance weights will tend to run toward this side and establish a proper balance. It is well known, however, that to merely release the balancing weights so that they are free to run, results in the weights overrunning the proper balancing position, first in one direction and then in the other, which thereby sets up an oscillation and makes it difficult to determine their correct position. By means of the present invention, a control mechanism has been provided which automatically permits the weights to creep to their correct position without unnecessary overrun and without skill and attention on the part of the operator. This mechanism includes a control which will unclamp the bearing and thereby allow the spindle to possess the desired low natural frequency, and automatically and intermittently release the balancing weights for very short periods of time so that the weights will creep to balancing position without overrun.

This mechanism is hydraulic in nature and is diagrammatically illustrated in Figure 7 of the drawings. As there shown, a constant delivery pump 84 supplies fluid from a reservoir 85, under pressure to a port 86 of a reversing valve 87. This valve has a plunger 88 which is manually shiftable by control 89 operatively connected thereto. This valve has a pair of ports 90 and 91 which are connected by channels 92 and 93 respectively to opposite ends of the cylinder 59. It also has a pair of exhaust ports 94 and 95 which are connected by a return channel 96 to the reservoir 85. The plunger 88 has a pair of annular grooves 97 and 98 formed therein which are of sufficient length that when the plunger is in the position shown, the pressure port 86 is connected to port 91 leading to the right hand end of cylinder 59 to cause rotation of the pinion 55 in a direction to cause clamping of the bearing in aperture 14. When the plunger is shifted in the opposite direction, pressure port 86 is connected to port 90 and the piston 58 is moved toward the right to cause unclamping of the spindle bearing. This will decrease the rigidity of the spindle mounting, as described above, so that the light side of the spindle assembly may run out sufficiently to cause the balancing weights to be moved by centrifugal force toward their correct balancing position.

The weights are caused to creep to this position by intermittently unclamping the collet 72, and this is accomplished by raising and lowering the hydraulic pressure acting on one end of piston 75 which is mounted in the cylinder 76. When the pressure is lowered the spring 82 is depended upon for returning the piston 75. To accomplish these results the end of cylinder 76 is connected by a channel 99 to port 100 of a first reversing valve 101, and through a branch channel 102 having a variable throttle or resistance 103 therein, to one end of a second reversing valve 104. The channel 92 through which pressure is being supplied to unclamp the bearing has a pair of branch lines 105 and 106 leading to ports 107 and 108 of the reversing valves 101 and 104 respectively. These ports are therefore pressure ports during the time that the spindle bearing is unclamped.

The reversing valve 101 has a pair of ports 109 and 110 which are connected to the return line 96, and a pair of ports 100 and 111 which are connected to opposite ends of valve 104 for causing shifting of the plunger 112 thereof from one of its extreme positions to the other thereof. Thus when the plunger 113 of reversing valve 101 is in one extreme position the annular groove 114 thereof interconnects port 107 with port 100 so that fluid flows to the left end of valve 104 and shifts the plunger 112 thereof to the right; and when the plunger 113 is in its left hand extreme position the annular groove 115 thereof interconnects port 107 with port 111 and causes fluid to flow to the right hand end of valve 104 and shift the plunger 112 to its left hand extreme position.

The valve 104 has a pair of ports 114 and 115 which are connected by channels 116 and 117 to opposite ends of the reversing valve 101. It also has a pair of exhaust ports 118 and 119 which are connected by a branch line 120 to the return channel 96. It will now be obvious that when the plunger 112 of the reversing valve 104 is in its left hand position, the annular groove 121 will interconnect port 108 with port 115 and fluid pressure will flow to the left hand end of reversing valve 101 and shift the plunger 113 thereof to its right hand extreme position; and when the plunger 112 is in its right hand extreme position, the annular groove 122 thereof will interconnect port 108 with port 114 and fluid will flow to the right hand end of valve 101 and shift the plunger 113 thereof to its left hand position. Thus each reversing valve acts as a pilot valve to cause shifting of the other reversing valve.

These two valves constitute an oscillator for varying the pressure in channel 99, for it will be observed that when the plunger 113 of reversing valve 101 is to the right that channel 99 is under pressure, and when the plunger is to the left the channel 99 is connected to the reservoir port 109. In order, however, to prevent violent oscillation, the throttle valve 103 has been provided and this can be adjusted to vary the period of oscillation. In other words, when pressure is admitted to channel 99 the piston 75 will be immediately moved because it is free to do so but the plunger 112 will not be moved until sufficient fluid has flown past the throttle 103 to cause the necessary movement. On the other hand, when the port 100 is connected to the reservoir port 109 the fluid in channel 99 will be free to escape to reservoir under the pressure of spring 82, but the movement of plunger 112 will be delayed due to the resistance of throttle 103 to the escape of fluid from the left end of the reversing valve 104. Thus by adjusting this throttle valve, the length of the period of time during which the weights are unclamped can be suitably varied.

It will be noted that when the control valve 87 is shifted into the position in which it is shown in Figure 7, that the port 90 will be connected to reservoir and therefore the pressure supply will be disconnected from the oscillator and the weights will remain clamped. Thus an operator, although being inexperienced in the principles of dynamic balancing, may, by merely controlling the lever 89, accomplish proper balancing of the assembled grinding wheel and spindle.

In Figure 5 is shown a slight modification of the balancing weight clamping mechanism which may be utilized when balls, such as 123, are utilized for balancing weights instead of cylindrical rolls. In this case the piston 75 is provided with a piston rod 124 which loosely fits a socket 125 formed in the end of a spring pressed plunger 126, which has an arcuate peripheral groove 127 on the end thereof for clamping the balls against the surface of the raceway 128 formed in the adapter 64.

When the weights, such as 123, are close together, as shown in Figure 6, they effect the maximum correction and when they are diametrically opposite one another they effect a minimum or zero correction. Therefore the angular relation between the weights determines the amount of correction effected and it is to be understood that the weights will automatically assume the proper angular relation between themselves in accordance with the amount of correction needed.

For the purpose of indicating to the operator when an unbalanced condition exists, and also for indicating when a true balanced condition has been obtained by use of the mechanism herein described, a vibration indicator 129 may be secured to the wheel guard 130, as shown in Figure 1. This indicator has a reed 131 which is subject to movement relative to graduations 132 which are etched on the glass 133 which forms a closure for one end of the tube 134 in which the reed is mounted. Thus, by looking at the glass, the operator can tell by the amount of movement of the reed relative to the graduation marks whether the parts are balanced or not.

There has thus been provided an improved automatic dynamic balancing mechanism for machine tools which may be incorporated as a part thereof and utilized by the operator at any time that balancing of the machine seems to be necessary.

We claim:

1. In a machine tool having a spindle and a grinding wheel attached to one end thereof, the combination of means for dynamically balancing said spindle, including a pair of spaced bearings for said spindle, one of said bearings having parts which are releasable to permit the spindle to vibrate with two degrees of freedom, power operated means for releasing said parts, balancing weights carried by the spindle for movement circumferentially thereof, means to secure said weights against movement, and means to automatically release said weights and permit their circumferential movement when said bearing parts are released.

2. In a grinding machine having a spindle and a grinding wheel attached thereto, the combination of a first bearing for supoprting one end of the spindle, a second bearing for supporting the other end of the spindle, including a plurality of shoes, means to rigidly clamp the shoes against radial movement to thereby determine the axis of rotation of said spindle, fluid operable means for unclamping said shoes whereby said spindle has two degrees of freedom, and balancing weights carried by said spindle and adapted to be automatically released upon unclamping of said shoes to effect automatic balancing of said spindle.

3. In a grinding machine having a spindle and a grinding wheel attached thereto, the combination of means for supporting said spindle, including a first bearing for positively supporting one end of the spindle, a second bearing, including a plurality of circumferentially spaced shoes, resilient mountings for said shoes, means for positively clamping said shoes against movement, fluid operable means for unclamping said shoes, balancing weights carried by the spindle, and means automatically operable upon unclamping of said shoes to free said weights for movement to the light side of said spindle.

4. In a machine tool having a spindle and a grinding wheel attached thereto, the combination of means for supporting said spindle for dynamic balancing thereof, including a first fixed bearing, a second bearing having a plurality of rocker shoes circumferentially spaced about said spindle, resilient supports for said shoes, a plurality of means for clamping said shoes against radial movement with respect to said spindle, fluid operable means for releasing said clamping means, including a fluid operable piston, a manually operable control valve carried by the machine, and means to automatically balance said spindle when said shoes have been released.

5. In a machine tool having a spindle and a grinding wheel attached thereto, the combination of means for dynamically balancing the assembled wheel and spindle, including spaced spindle bearings, one of which includes a plurality of rocker shoes circumferentially spaced about said spindle, wedging means for clamping said shoes against radial movement to thereby rigidly support the spindle, means to withdraw said wedges, including an eccentric, a link coupling said eccentric to said wedges, fluid operable means for rotating said eccentric in one direction to insert said wedges and in the other direction to release said wedges, and means automatically releasable upon rotation of said eccentric in the last named direction to effect automatic balancing of said spindle.

6. In a grinding machine having a spindle and a grinding wheel attached thereto, the combination of means for dynamically balancing said spindle, including a plurality of balancing weights carried thereby, means to clamp said weights against movement, and power operated means for oscillating said clamping means during balancing to intermittently release said weights whereby they may creep to a balancing position.

7. In a grinding machine having a spindle and a grinding wheel attached thereto, the combination of means for dynamically balancing said spindle during rotation thereof, including a plurality of balancing weights carried by the spindle, spring urged means for clamping said weights against movement, and a fluid operated oscillator for imparting pulsations to said clamping means whereby the weights will be intermittently released for creeping movement to a balancing position.

8. In a grinding machine having a spindle and a grinding wheel attached thereto, the combination of means for dynamically balancing said spindle during rotation thereof, including a plurality of balancing weights carried by the spindle, spring urged means for clamping said weights against movement, a fluid operated oscillator for imparting pulsations to said clamping means whereby the weights will be intermittently released for creeping movement to a balancing position, and means to vary the frequency of said pulsations.

9. In a grinding machine having a spindle and a grinding wheel attached thereto, the combination of means for dynamically balancing said spindle, including a pair of balancing weights, resiliently urged means for clamping said weights against relative movement with respect to said spindle, a fluid operated piston for releasing said weights, and means to impart oscillation to said piston during rotation of the spindle, including a source of fluid pressure, and means to intermittently connect said source with said piston.

10. In a machine tool having a tool spindle and a grinding wheel attached to one end thereof, the combination with a support, of means for supporting said spindle for rotation, including a first bearing means for rigidly supporting the spindle, a driver attached to the spindle adjacent said first bearing means for effecting rotation thereof, a second bearing means for rigidly supporting the spindle, power operated means for releasing said last named bearing means whereby the spindle may move with two degrees of freedom about the first bearing means acting as a fulcrum, balancing weights carried by the free end of the spindle, and coupled means to release said weights when said bearing is released to permit them to be moved by centrifugal force to the light side of said spindle for dynamic balancing purposes.

11. Means for automatically effecting dynamic balance of a grinding wheel spindle having spaced bearings for supporting the same, including releasable members associated with one of said bearings to permit lateral oscillation of the spindle during rotation thereof, balancing weights carried by the spindle, means to resiliently clamp the weights in position, and power operated means for simultaneously actuating said members to release the bearing and for intermittently releasing said weights to permit movement thereof by centrifugal force developed by the lateral oscillating spindle to the light side of the spindle to balance the same.

12. Means for automatically effecting dynamic balance of a grinding wheel spindle having spaced bearings for supporting the same, including members associated with one of said bearings, means normally urging said members to restrain the bearings against movement, means to shift said members to permit lateral oscillation of the spindle during rotation thereof, balancing weights carried by the spindle, means to resiliently clamp the weights in position, and fluid operated means for simultaneously actuating said member shifting means to release the bearing and for intermittently releasing said weights to permit movement thereof by centrifugal force developed by the lateral oscillating spindle to the light side of the spindle to balance the same.

13. Means for automatically effecting dynamic balance of a grinding wheel spindle having spaced bearings for supporting the same, including members associated with one of said bearings, means normally urging said members to restrain the bearings against movement, means to shift said members to permit lateral oscillation of the spindle during rotation thereof, balancing weights carried by the spindle, means to resiliently clamp the weights in position, fluid operated means for simultaneously actuating said member shifting means to release the bearing and for intermittently releasing said weights to permit movement thereof by centrifugal force developed by the lateral oscillating spindle to the light side of the spindle to balance the same, and a manually operable control valve for controlling the connection of fluid pressure to said fluid operated means.

14. In a grinding machine having a grinding wheel spindle, spaced bearings for supporting said spindle for rotation, and a pair of balancing weights carried by the spindle and resiliently clamped thereto for rotation therewith, one of said bearings being releasable to permit lateral oscillation of said spindle, the combination of fluid operable means for releasing said bearing and said weights, including a start and stop control valve having a source of pressure connected thereto, a fluid operable piston for releasing said bearing, a second fluid operable piston for releasing said weights, a reversing valve for said last named piston, a pilot valve, means connecting the pilot valve and reversing valve for mutual interaction whereby each one serves as a pilot valve to cause shifting of the other, thus constituting an oscillator for controlling the weight releasing piston, and adjustable means for controlling the rate of oscillation.

HANS ERNST.
ALBERT H. DALL.